(12) United States Patent
Stephens

(10) Patent No.: US 8,419,117 B2
(45) Date of Patent: Apr. 16, 2013

(54) MEANS FOR ACCESSING A VEHICLE IN AN EMERGENCY

(76) Inventor: Craig Anthony Stephens, Parkmore (ZA)

( * ) Notice: Subject to any disclaimer, the term of this patent is extended or adjusted under 35 U.S.C. 154(b) by 0 days.

(21) Appl. No.: 12/442,122

(22) PCT Filed: Sep. 14, 2007

(86) PCT No.: PCT/IB2007/002662
§ 371 (c)(1),
(2), (4) Date: Mar. 20, 2009

(87) PCT Pub. No.: WO2008/041072
PCT Pub. Date: Apr. 10, 2008

(65) Prior Publication Data
US 2010/0019546 A1    Jan. 28, 2010

(30) Foreign Application Priority Data
Oct. 5, 2006    (ZA) .................................. 2006/08300

(51) Int. Cl.
*B60K 37/00*    (2006.01)

(52) U.S. Cl.
USPC .................................................. 296/203.03

(58) Field of Classification Search ............. 296/203.03, 296/187.05; 280/808, 730.2, 753, 801.2; 180/271; 701/45
See application file for complete search history.

(56) References Cited

U.S. PATENT DOCUMENTS

| | | | | |
|---|---|---|---|---|
| 1,376,442 A | * | 5/1921 | Kehoe ........................... | 296/150 |
| 1,379,826 A | * | 5/1921 | Kehoe ........................... | 296/150 |
| 1,383,374 A | * | 7/1921 | Belden ........................... | 296/150 |
| 1,639,037 A | * | 8/1927 | Hollingshead .................. | 49/365 |
| 1,869,274 A | * | 7/1932 | Phillips ........................... | 49/365 |
| 2,022,718 A | * | 12/1935 | Heins ............................... | 292/38 |
| 2,022,869 A | * | 12/1935 | Reid ............................. | 296/182.1 |
| 2,055,889 A | * | 9/1936 | Ball ............................... | 296/116 |
| 2,567,294 A | * | 9/1951 | McClintock .................. | 296/202 |

(Continued)

FOREIGN PATENT DOCUMENTS

| | | |
|---|---|---|
| DE | 35 41 325 A1 | 6/1987 |
| DE | 103 52 496 A1 | 6/2005 |

(Continued)

OTHER PUBLICATIONS

International Search Report, International Application No. PCT/IB2007/002662, International Searching Authority, mailed Apr. 16, 2009.

(Continued)

*Primary Examiner* — Kiran B Patel
(74) *Attorney, Agent, or Firm* — Nixon Peabody LLP

(57) ABSTRACT

This invention relates to a means for facilitating access to a motor vehicle in an emergency to extricate the driver and/or passengers. In its simplest form the means is at least one removable pillar which ca be the A, B, C or D pillar of the vehicle. The pillar or pillars are equipped with handle actuated latches which enable the pillar or pillars to be removed without cutting equipment. The invention also provides for a removable seat or seats and a pivotable steering wheel or column and dashboard and all of which are aimed at removing occupants from a wrecked vehicle without having to wait for specialized cutting equipment. The invention also extends to a vehicle fitted with said means.

8 Claims, 5 Drawing Sheets

U.S. PATENT DOCUMENTS

| | | | |
|---|---|---|---|
| 5,544,934 A * | 8/1996 | Murkett et al. | 296/215 |
| 5,738,405 A * | 4/1998 | Richters et al. | 296/193.03 |
| 5,947,546 A * | 9/1999 | Hilliard et al. | 296/107.11 |
| 5,967,591 A * | 10/1999 | Muehlhausen | 296/107.16 |
| 6,010,178 A * | 1/2000 | Hahn et al. | 296/107.08 |
| 6,309,007 B1 * | 10/2001 | Essig et al. | 296/103 |
| 6,736,445 B2 * | 5/2004 | Obendiek | 296/107.17 |
| 6,860,542 B1 | 3/2005 | Zabtcioglu | |
| 7,008,011 B2 * | 3/2006 | Gevay | 296/218 |
| 7,128,363 B2 * | 10/2006 | Fischer | 296/108 |
| 7,278,507 B2 * | 10/2007 | Walworth | 180/208 |
| 7,506,917 B2 * | 3/2009 | Essig et al. | 296/121 |
| 7,597,380 B1 * | 10/2009 | Adjwok | 296/107.08 |
| 7,794,007 B2 * | 9/2010 | Konet et al. | 296/146.16 |

FOREIGN PATENT DOCUMENTS

| | | |
|---|---|---|
| EP | 1 408 470 A2 | 4/2004 |
| EP | 1408470 A2 | 4/2004 |
| JP | 02-034452 | 2/1990 |

OTHER PUBLICATIONS

International Search Report for PCT/IB2007/002662 Dated Jun. 3, 2008.

* cited by examiner

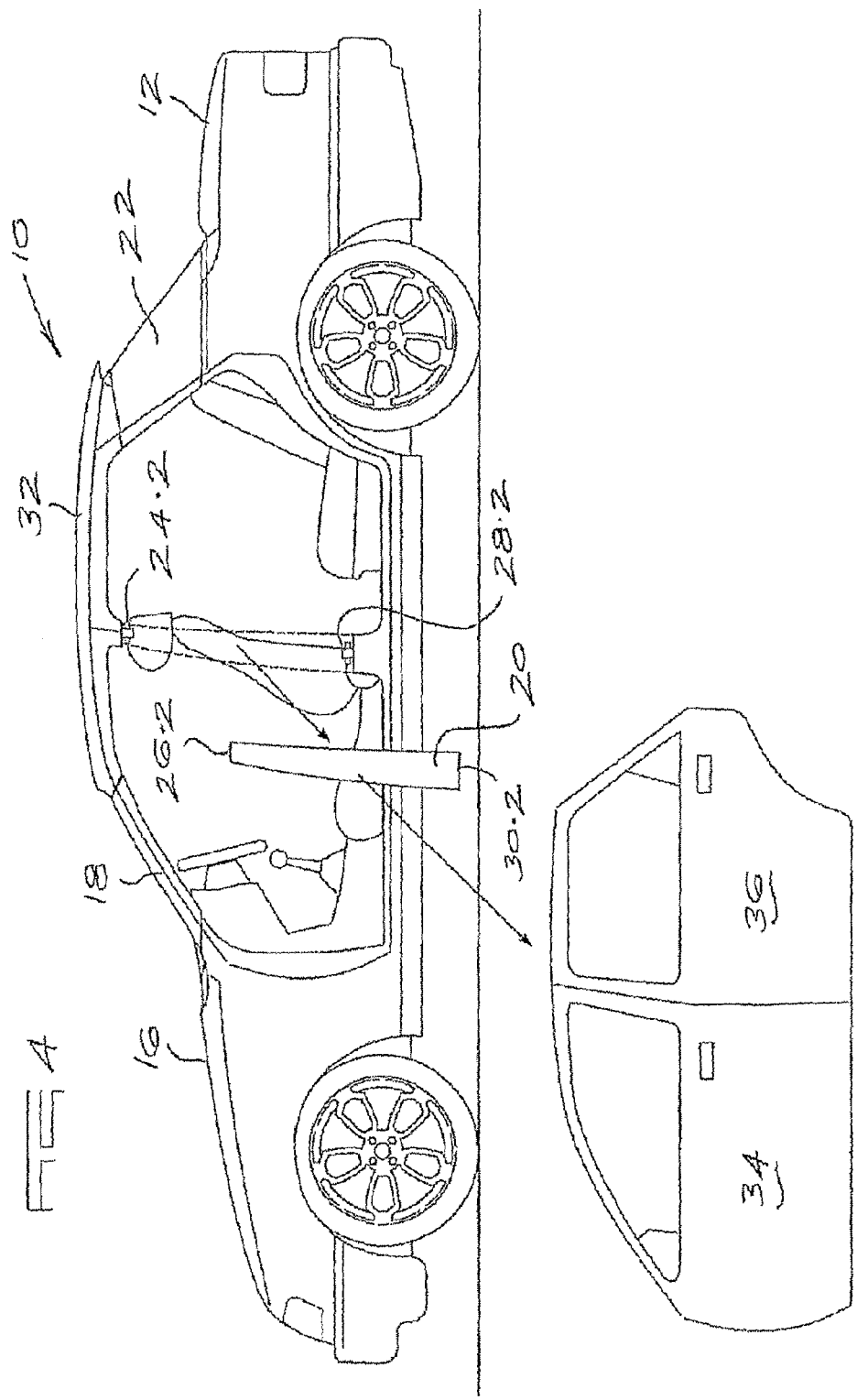

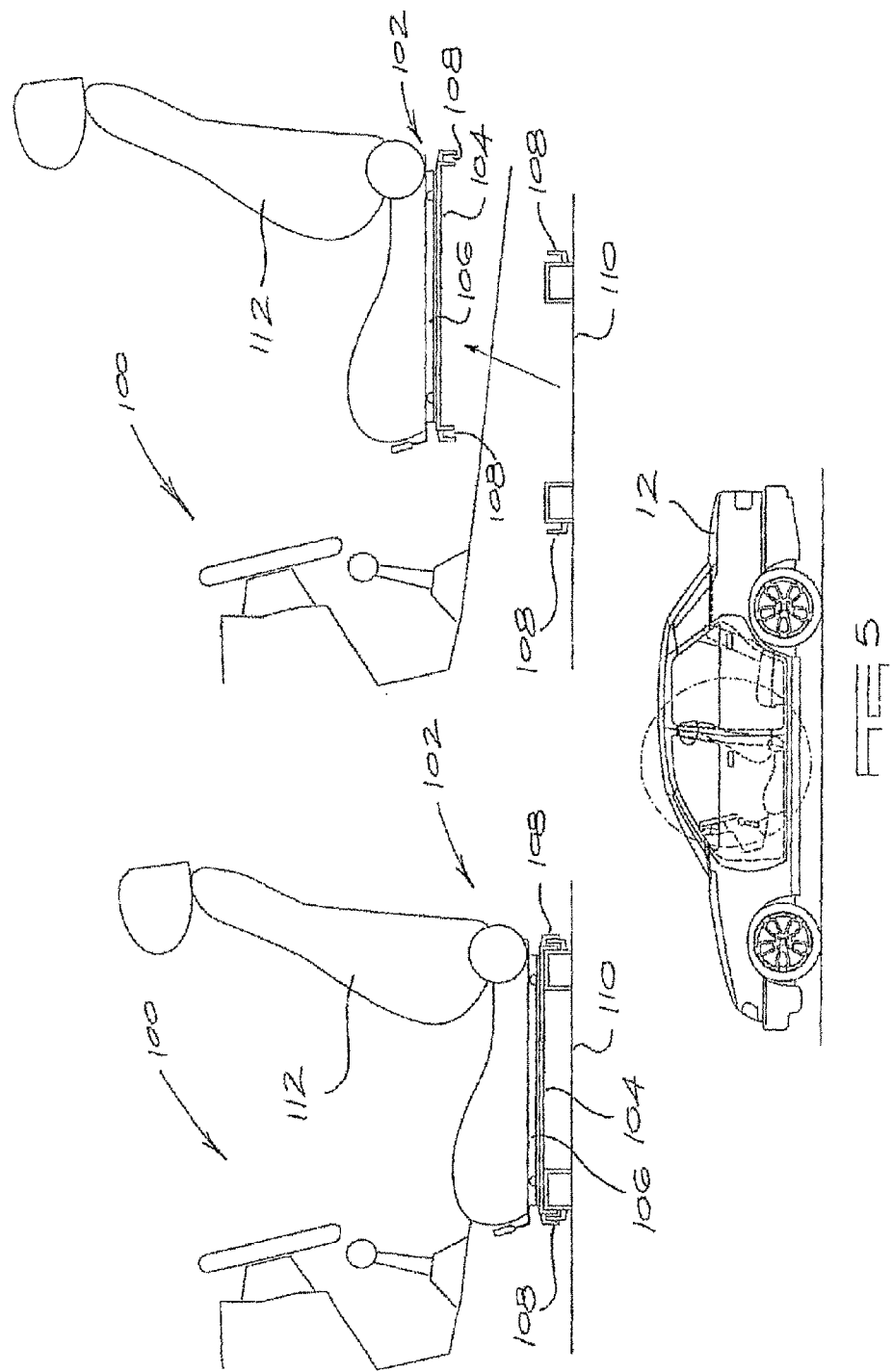

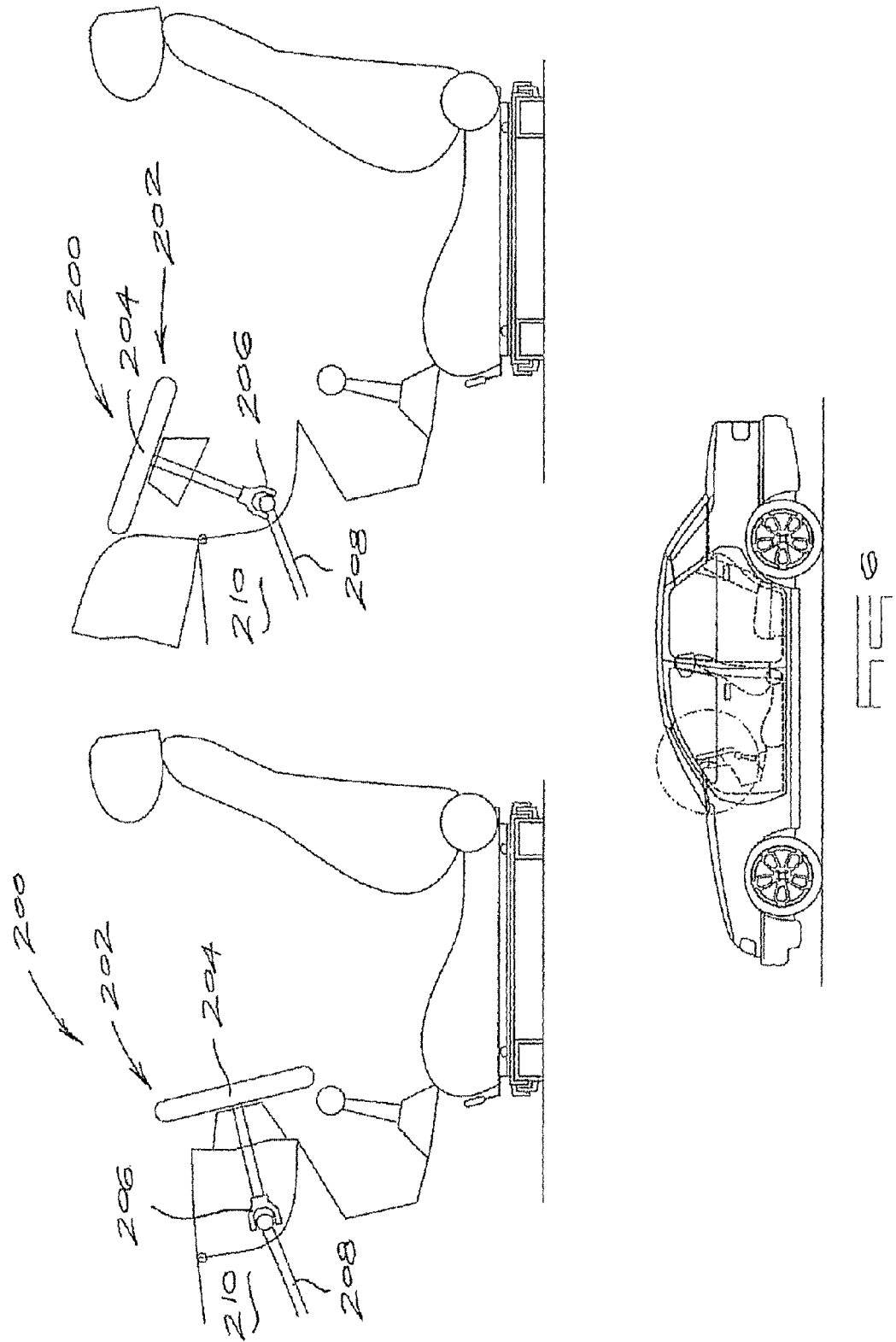

MEANS FOR ACCESSING A VEHICLE IN AN EMERGENCY

FIELD OF THE INVENTION

This invention relates to means for facilitating obtaining access to occupants of a vehicle in an emergency and, more specifically, to a vehicle and to vehicle parts configured to facilitate emergency access to a vehicle.

BACKGROUND TO THE INVENTION

Vehicle safety devices can generally be classified as passive, active safety or post crash safety devices. Active safety devices are aimed at collision avoidance, and include safety devices and systems such as anti-lock braking, electronic stability control, traction control and head-up displays.

Passive safety devices are aimed at reducing the effects of a vehicle collision, and include crumple zones, air bags, safety belt tensioners, collapsible steering columns and the like. These devices help protect the occupants of a vehicle during an accident. Post accident safety devices are aimed at injury mitigation, and include devices that isolate a vehicle's power supply, activate hazard lights, notify emergency services of the incident and the like.

In a significant number of severe motor vehicle accidents occupants become trapped within a damaged vehicle. Often, the occupants cannot be extricated by emergency personnel without the assistance of specialised vehicle extrication equipment. Vehicle extrication equipment, such as hydraulic rams, cutters and spreaders (such as the so-called Jaws of Life), are generally very expensive and are typically carried only by fire engines and specialised accident units which are not always a primary response to accidents. In addition, even where vehicle occupants are not trapped within a damaged vehicle, extrication techniques may be used in order to give paramedics and emergency personnel better access to the occupants to treat the occupants and remove them without obstruction which could further exacerbate injury. In many motor vehicle accidents, the emergency personnel that are first to arrive on the accident scene are generally unable to assist the occupants until the vehicle extrication equipment arrives, and the resultant delays can result in further occupant injury or even death. Most vehicle safety specifications measure only the extent of active and passive safety devices, which are effective only until immediately after the accident.

There have been recent attempts by manufacturers of motor vehicles to provide safety systems that extend beyond the scope of active and passive safety devices. For example, systems that unlock doors, turn on interior lighting, shut off fuel supply, disconnect the battery terminal from the alternator or automatically notify a response centre in the event of an accident are known. These systems, however, do not provide sufficient means for enabling the occupants of badly damaged vehicles to be extricated or accessed without the use of specialised vehicle extrication equipment.

Significant damage is generally caused to a vehicle during occupant extrication. Very often components of the vehicle which were not damaged during the accident become damaged beyond repair as a result of the extrication. Such damage often results in a vehicle being completely written off whereas it may otherwise still have been viable were it not necessary to use extrication equipment.

In recent years motor vehicle manufacturers have started using stronger materials to enhance the safety performance of vehicles such as UHSS/Boron (Ultra High Strength Steel) and HSLA (High Strength Light Alloy) in the production of vehicles. These materials require specially adapted cutting equipment with strengthened cutting edges and increased pressure outputs which are not always readily available to emergency personnel.

In this specification the term "pillar" refers to a structural element of a vehicle that extends between the roof of the vehicle and lower parts of the vehicle body. In an automobile, the gaps between pillars are typically used for doors and windows. The "A-pillar" refers to the pillar closest to the front end of a vehicle which typically supports the windshield, the "B-pillar" is the second pillar from the front end on which vehicle doors are typically hinged, and the "C-pillar" is the third pillar from the front end, which may be the rearmost pillar supporting the rear windshield or may be an intermediate pillar. Further pillars, such as D-pillars or E-pillars may be provided depending on the type of vehicle. The term "body" in relation to a vehicle includes the roof of the vehicle. In addition, the term "vehicle" is intended to include within its scope, motor vehicles and aircraft, particularly light aircraft both fixed and rotary winged.

OBJECT OF THE INVENTION

It is an object of the invention to provide means for facilitating obtaining access to occupants of a vehicle in an emergency which at least partially alleviates some of the above-mentioned problems.

SUMMARY OF THE INVENTION

In accordance with a first aspect of the invention there is provided a means for facilitating obtaining access to occupants of a vehicle in an emergency comprising a vehicle pillar having release means for detaching the pillar from the body of the vehicle, thus facilitating access to the vehicle and, consequently, to occupants of said vehicle.

Further features of the invention provide for the vehicle pillar to be an A-pillar, B-pillar, C-pillar or D-pillar; for the vehicle pillar to have release means at both ends; for the release means to be a mechanical latch; for the latch to be actuated by a handle, from the interior and/or exterior of the vehicle. Alternatively there is provided for the release means to be one or a combination of an electrical, pneumatic, hydraulic, magnetic, chemical or explosive latch.

The invention extends to a vehicle having at least one vehicle pillar that includes release means for detaching the pillar from the body of the vehicle, thus facilitating access to the vehicle.

In accordance with a second aspect of the invention there is provided a means for accessing a vehicle in an emergency comprising a vehicle seat platform including a plate having vehicle seat rails mounted thereon and having release means for detaching the plate from a foot well of the vehicle.

There is further provided for the plate to include seat accessories and devices which are normally mounted on the foot well of the vehicle.

Further features of the invention provide for the plate to be a metal plate, alternatively a rigid plastics material plate, and for the release means to be at least one latch actuatable by at an actuating means selected from the group comprising a mechanical, electrical, pneumatic, hydraulic, magnetic, chemical or explosive means.

The invention extends to a vehicle having at least one vehicle seat mounted on a vehicle seat platform that includes a plate having vehicle seat rails and other necessary seat accessories and devices which are normally mounted on the foot well, mounted thereon and release means provided for detaching the plate from a foot well of the vehicle.

In accordance with a third aspect of the invention there is provided a means for accessing a vehicle in an emergency comprising a steering wheel assembly having tilting means for pivoting a steering wheel by at least 45 degrees into a position where it is less of an obstruction to the extrication of a driver of the vehicle.

Further features of the invention provide for the tilting means to include a universal joint provided in the steering column of the steering wheel assembly; and for pivoting or removal means to be provided in the instrument console or portion of the dashboard of the vehicle to permit at least a portion of the instrument console to be pivoted away from the steering wheel or unlatched and removed, to enable substantial pivoting of the steering wheel.

The invention extends to a vehicle that includes a steering wheel assembly having tilting means for pivoting the steering wheel by at least 45 degrees into a position where it is less of an obstruction to accessing or the extrication of a driver of the vehicle.

In accordance with a fourth aspect of the invention there is provided a means for accessing a vehicle in an emergency comprising a vehicle door having release means for releasing a hinge and/or latch of the vehicle door to enable the door to be detached from the vehicle, thus facilitating access to the vehicle.

Further features of the invention provide for the release means to include mechanical latches (electrical, pneumatic, hydraulic, magnetic, chemical or explosive latches); for the latches to have handles or activation devices; and for the handles or activation devices to be mounted in the respective A, B or C-pillars, the roof or roof rails, floor or anywhere else in the vehicle.

Still further features of the invention provide for the handles to be provided in recesses in the pillars; and to be covered with easily removable panels.

The invention extends to a vehicle having at least one door assembly that includes release means for releasing a hinge and/or latch of the vehicle door to enable the door to be detached from the vehicle.

BRIEF DESCRIPTION OF THE DRAWINGS

The invention will now be described, by way of example only, with reference to the accompanying drawings. In the drawings.

FIG. 4 is a side elevation of the vehicle of FIG. 1 with a B-pillar removed;

FIG. 5 is a side elevation of a vehicle including means for accessing the vehicle in accordance with a second aspect of the invention; and FIG. 6 is a side elevation of a vehicle including means for accessing the vehicle in accordance with a third aspect of the invention.

DETAILED DESCRIPTION OF THE DRAWINGS

Figure 1:
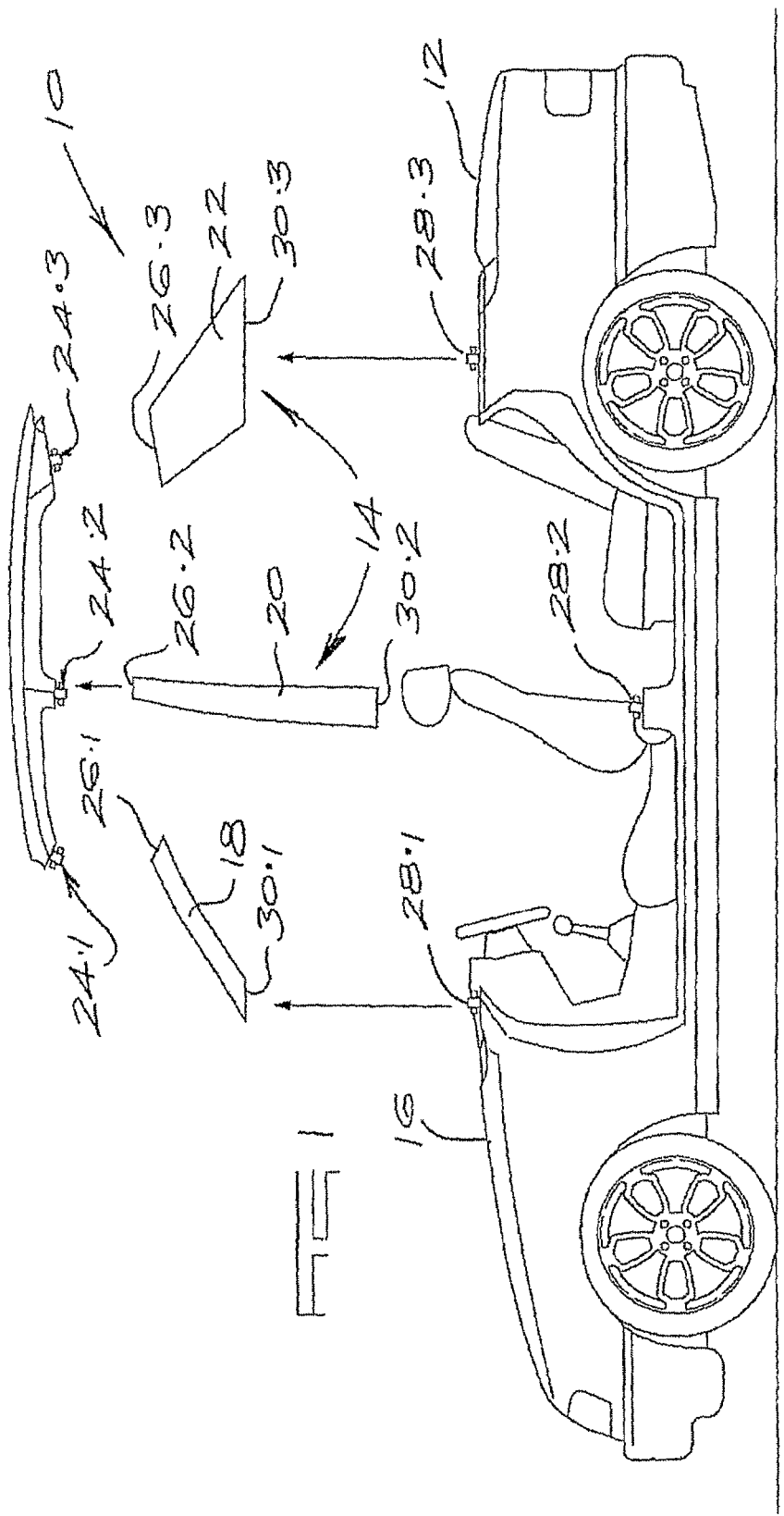
FIG. 1 is an exploded side elevation of a vehicle including means for accessing the vehicle in accordance with a first aspect of the invention.
Figure 2:
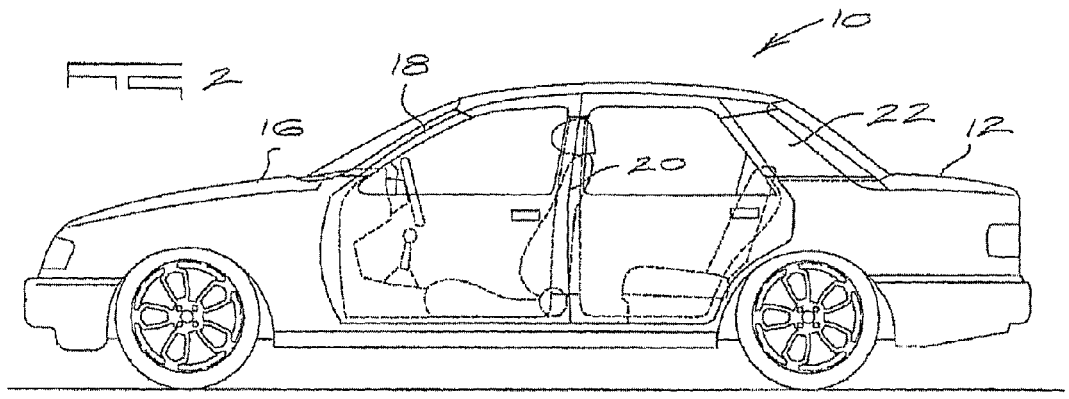
FIG. 2 is a side elevation of the vehicle of FIG. 1 with the means for accessing the vehicle in a non-detached condition.

FIGS. 1 to 4 show a first means (10) for accessing a vehicle (12) in accordance with the invention. The first access means (10) includes vehicle pillars (14) having release means for detaching the pillars (14) from the body (16) of the vehicle to facilitate extrication of an occupant of the vehicle (12). In this embodiment, the vehicle (12) is a sedan and the pillars (14) include an A-pillar (18), B-pillar (20) and C-pillar (22). While the invention has been described with reference to a sedan having three pillars, it will be appreciated that the invention is not limited to sedans and can be applied to sports utility vehicles, light delivery vehicles, trucks, busses or any other vehicle which would include fixed and rotor winged aircraft. Such vehicles may have more than three pillars.

The release means includes first mechanical latches (24.1, 24.2, 24.3) configured to cooperate with engaging formations on an upper end (26.1, 26.2, 26,3) of each pillar (18, 20, 22) and second mechanical latches (28.1, 28.2, 28.3) configured to cooperate with engaging formations on a lower end (30.1, 30.2, 30.3) of each pillar (18, 20, 22).

The first and second sets of latches (24, 28) are actuated by handles (not shown) provided in the pillars (14). The handles are located in the interior trim of the pillars (14) and are conspicuously marked so as to be easily identified by vehicle occupants, emergency services personnel or bystanders. An easily removable panel may cover the handles to prevent accidental actuation. Because B-pillars are often most damaged in the centre during an accident, the handles are preferably located near the ends of the B-pillar to help avoid damage to the latch mechanisms. Alternatively, a single handle may be provided to actuate both latches.

Figure 3:
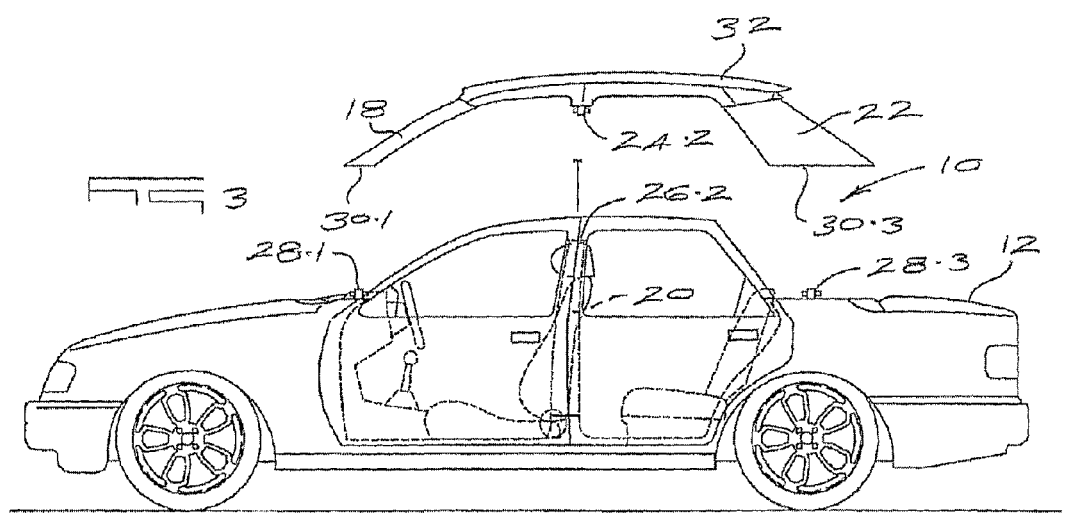
FIG. 3 is a side elevation of the vehicle of FIG. 1 with a roof removed.

In use, a trapped occupant of the vehicle or emergency services personnel is able to release the latches (24, 28) by pulling on any of the respective handles. To release the roof (32) the second mechanical latches (28.1, 28.2, 28.3) can be released, in which case the pillars (14) are be lifted free of the body (16) together with the roof (32). Preferably, as shown in FIG. 3, the second mechanical latches (28.1, 28.3) on the A and C-pillars are released and the first mechanical latch (24.2) on the B-pillar is released. Should the second mechanical latches (28.1, 28.3) on the A and C-pillars not be functional, the first mechanical latches (24.1, 24.3) can be used instead. A roof of a vehicle will typically be removed in situations where the roof has collapsed, trapping an occupant, or in cases where an occupant must first be stabilised before being extricated from the vehicle. In most cases, it is necessary to remove all pillars and other supporting structures when effecting a roof extrication, to minimise the risk of spinal or other injury to an occupant.

FIG. 4 shows a further application of the first access means (10) in use. The B-pillar (20) is often a major obstruction for the extrication of an occupant, even if the doors (34, 36) of the vehicle have been opened. Injured occupants can also be more carefully removed using stretchers for example, if the B-pillar (20) is removed. In some cases, such as when the roof (32) cannot be removed because the vehicle (12) has overturned, removal of the B-pillar (20) must be done without damaging the rest of the vehicle (12) structure. The B-pillar (20) can be detached by releasing the latches (24.2, 28.2) at either end of the B-pillar (20). Since a rear door (36) of the vehicle (12) is typically hinged to the B-pillar (20) and a front door (34) of the vehicle (12) is latched to the B-pillar, if the B-pillar (20) is released as shown in FIG. 4 and the rear door catch is released, both of the doors (34, 36) and the B-pillar (20) can move outward on the front door's hinges to expose the vehicle occupants. This is known as a Side Removal.

The first access means (10) therefore enables the pillars of a vehicle to be detached from the body of the vehicle, facilitating the extrication of occupants trapped in the vehicle or to obtain better access to occupants of the vehicle.

FIG. 5 shows a second means (100) for accessing a vehicle (12) in accordance with the invention. The second access means (100) includes a vehicle seat platform (102), the platform (102) including a metal (or other rigid material) plate (104) having vehicle seat rails and other necessary seat accessories and devices which are normally mounted on the foot well, (106) mounted thereon and having release means, in this embodiment a pair of mechanical latches (108) (although a single mechanical latch coupled with a metal lip may be used) for detaching the metal plate (104) from a foot well (110) of the vehicle (12). Preferably, the plate (104) is made of steel (or other rigid material). A vehicle seat (112) is slidably mounted on the rails (106) in the usual manner.

In use, the vehicle seat (12) may be released from the foot well (110) of the vehicle (12) by actuating the mechanical latches (108), freeing the metal plate (104) from engagement with the foot well (110).

In some vehicle accidents, particularly in side-impact collisions, the rails on which existing vehicle front seats mounted are bent out of alignment so that they are no longer parallel, preventing the seat from being moved backwards on its rails. It may also happen that the front of the vehicle may deform, trapping an occupant behind the steering wheel or dashboard of the vehicle. Where an occupant could otherwise have been extricated by sliding the vehicle seat backwards, it then becomes necessary to break or cut the seat free from the vehicle body or to push the dashboard and/or steering wheel away from the trapped occupant using hydraulic spreaders or rams to perform what is commonly known as a "Dashboard Roll" or "Dashboard Lift". In some cases, it would also be possible to extricate the patient if the vehicle seat could be moved further backwards than the rails permit. Furthermore, some luxury vehicles have electric motors that move the seats on the rails. If these seats do not have a manual override they may be rendered inoperable, as it is accepted practice to disconnect the vehicle's battery terminals to reduce the risk of an electrical fire or the deployment of airbags during extrication procedures.

The second access means (100) therefore aids in the extrication of an occupant by providing means for releasing the vehicle seat (12) from its engagement with the foot well (110) of the vehicle (112). The vehicle seat (112) can be completely removed from the vehicle (12) with the occupant still therein, or the seat (112) can be moved backwards to free a trapped occupant. The metal plate (104) on which the rails (106) are mounted also helps to protect the rails (106) from being bent out of alignment.

FIG. 6 shows a third means (200) for accessing a vehicle (12) in accordance with the invention. The third access means (200) includes a steering wheel assembly (202) with tilting means for pivoting a steering wheel (204) into a position in which the steering wheel (204) is less of an obstruction to the extrication of or accessing of a driver of the vehicle (12). The tiling means includes a universal joint (206) provided in the steering column (208) to enable substantial pivoting of the steering wheel (204). To accommodate the tiling action of the steering wheel (204), the instrument console or portion of the dashboard (210) of the vehicle (12) also includes a hinged or latched section (212) that can be pivoted away from the steering wheel (204) or completely removed. The instrument console (210) may be attached to the steering column (208) so that as the steering wheel (204) is tilted, the instrument console (210) automatically moves out of the way of the steering wheel (204). The instrument console (210) could, alternatively, be detachable instead of pivotable. The steering wheel may also have a latch device so that it can be detached from the steering column. In addition, the universal joint in the steering column may have a latch so that the upper portion of the steering column including the steering wheel may be detached from the lower portion of the steering column and removed.

The third access means (200) therefore aids in the extrication of a driver of the vehicle by providing means for moving a steering wheel of the vehicle into a position where it is less of an obstruction. This also gives emergency personnel more space to stabilize and treat an injured occupant.

The invention also includes a fourth means for accessing a vehicle, which is not separately illustrated but is described with general reference to the existing drawings. The fourth access means includes a vehicle door having release means for releasing a hinge and/or latch of the door to enable the door to be detached from the vehicle. The release means includes mechanical latches mounted in the A, B or C-pillars of the vehicle or in the door panels or the body of the vehicle. Handles mounted to the latches are provided in the interior trip of the vehicle pillars, and are preferably covered by removable panels to prevent accidental actuation. Typically, a single latch provided on the B-pillar would release both the front door catch and the back door hinge fastened to that pillar.

In use, a door that is jammed can be detached from the body of the vehicle by a trapped occupant or by emergency services personnel or bystanders by the releasing of one or more of the mechanical latches. If used in conjunction with the first access means, the doors of the vehicle and the B-pillar can be removed by releasing the B-pillar latches and releasing the rear door catch using a latch in the C-pillar or body. Both doors and the B-pillar can then be pivoted outwards on the front door's hinges.

The fourth access means therefore aids in the extrication or accessing of an occupant of the vehicle by providing means for detaching one or more doors of the vehicle.

The invention therefore provides a number of means for extrication of occupants from damaged vehicles. The invention enables trapped occupants to free themselves in some cases and, importantly, provides means for ordinary emergency services personnel to free trapped occupants without having to wait for specialised vehicle extrication equipment to arrive. The invention also helps limit the damage caused to an otherwise viable vehicle during extrication of an occupant by reducing the need to break or cut panels and/or parts of the vehicle to free the occupants. In addition, by attaching certain components later on in the assembly process such as the B-Pillar affords assembly technicians more space in which to work and will facilitate the fitting of larger items such as seats and dashboards thereby streamlining the assembly process.

It will be appreciated that many other embodiments of means for accessing vehicles may be devised which fall within the scope of the invention. For example, the release means need not be mechanical latches but could be electrical, pneumatic, hydraulic, magnetic, chemical or explosive latches. Not all pillars need have a latch at either end. If the A and C pillars have only one latch whereas the B-pillar has two, then the B-pillar can be removed individually by releasing both latches, and the roof can be removed by releasing the latches on the A and C-pillars and one of the latches on the B-pillar. A vehicle may have either 1 or 2 latches for the A and C-Pillars but should have at least 1. The B-Pillar could have a latch at its upper end and a hinge at the lower end. The vehicle could include safety systems that prevent the latches from being actuated in the event that the vehicle is moving, or only in the event that a collision is detected, so as to prevent the vehicle parts from being detached in non-emergency situations. Sensors may be fitted to the devices to deactivate airbags after an accident to prevent deployment of airbags during access or extrication procedures.

The invention claimed is:

1. A system that facilitates access to occupants of a vehicle in an emergency, the system comprising:
   a front door of the vehicle, the front door including a first front-door end and a second front-door end;
   a rear door of the vehicle, the rear door including a first rear-door end and a second rear-door end;
   a vehicle B-pillar disposed between the front door and the rear door, the vehicle B-pillar including a lower end and an upper end, the vehicle B-pillar extending between a body of the vehicle at the lower end and a roof of the vehicle at the upper end;
   a first release means positioned at the lower end of the vehicle B-pillar, wherein the vehicle B-pillar is engaged with the body of the vehicle via the first release means;
   a second release means positioned at the upper end of the vehicle B-pillar; and
   at least one actuating means that releases the first and second release means and detaches the vehicle B-pillar from the body of the vehicle at the lower end of the vehicle B-pillar and from the roof of the vehicle at the upper end,
   wherein the first front-door end is coupled to a front portion of the vehicle by at least one front-door hinge and moves about the at least one front-door hinge to be latched to the vehicle B-pillar,
   the first rear-door end is coupled to the vehicle B-pillar by at least one rear-door hinge and moves about the at least one rear-door hinge to be latched to a rear portion of the vehicle by a rear door catch, and
   in response to the detaching of the vehicle B-pillar from the body of the vehicle and from the roof and the releasing of the rear door catch of the rear door from the rear portion of the vehicle, the rear door and the vehicle B-pillar are operable to be detached from the vehicle so that, upon opening the front door, access to the occupants of the vehicle is facilitated.

2. The system of claim 1, wherein the at least one actuating means includes a first actuating means to release the first release means and a second actuating means positioned on the vehicle pillar to release the second release means.

3. The system of claim 2, wherein the first actuating means is positioned proximate to the first release means and the second actuating means is positioned proximate to the second release means.

4. The system of claim 1, wherein the first release means and the second release means each include a mechanical latch, an electrical latch, a pneumatic latch, a hydraulic latch, a magnetic latch, a chemical latch or an explosive latch.

5. The system of claim 1, wherein the at least one actuating means is positioned in an interior of the vehicle.

6. The system of claim 1, wherein the at least one actuating means is positioned exterior to the vehicle.

7. The system of claim 1, wherein the roof is removable from the vehicle by releasing the second release means to detach the roof from the vehicle B-pillar, or by releasing the first release means to detach the vehicle B-pillar from the body of the vehicle so that the roof is coupled to the vehicle B-pillar when removed.

8. The system of claim 1, wherein in response to the detaching of the vehicle B-pillar from the body of the vehicle and from the roof and the releasing of the rear door catch, the rear door, the vehicle B-pillar, and the front door move together about the front-door hinge.

* * * * *